United States Patent
Pham et al.

(10) Patent No.: US 7,097,008 B2
(45) Date of Patent: Aug. 29, 2006

(54) FRICTION ASSEMBLY AND METHOD FOR MANUFACTURING SAME

(76) Inventors: Nghi Pham, 100 Prairie Dunes Place, Concord, Ontario (CA) L4K 2E4; Michael Greenberg, 11 Grenadier Crescent, Thornhill, Ontario (CA) L4J 7W2; Joe McIsaac, 848 Nantyr Drive, Innisfil, Ontario (CA) L9S 1S8; Anthony Giannone, 2549 Trondheim Crescent, Mississauga, Ontario (CA) L5N 1P3

( * ) Notice: Subject to any disclaimer, the term of this patent is extended or adjusted under 35 U.S.C. 154(b) by 0 days.

(21) Appl. No.: 10/671,856

(22) Filed: Sep. 25, 2003

(65) Prior Publication Data
US 2005/0067235 A1    Mar. 31, 2005

(51) Int. Cl.
F16D 69/00    (2006.01)
(52) U.S. Cl. ................. 188/250 B; 188/261
(58) Field of Classification Search ............ 188/250 E, 188/250 B, 250 F, 261
See application file for complete search history.

(56) References Cited

U.S. PATENT DOCUMENTS

| | | | | |
|---|---|---|---|---|
| 3,106,266 A | * | 10/1963 | Reese | 188/335 |
| 3,190,397 A | * | 6/1965 | Sudres | 188/1.11 R |
| 3,198,294 A | * | 8/1965 | Stacy | 188/234 |
| 3,295,642 A | * | 1/1967 | Dean | 188/234 |
| 3,346,076 A | * | 10/1967 | Hayes | 188/73.45 |
| 3,349,871 A | * | 10/1967 | Walther et al. | 188/73.39 |
| 3,486,589 A | * | 12/1969 | Hillegass | 188/73.32 |
| 4,121,699 A | * | 10/1978 | Tsuruta et al. | 188/73.43 |
| 4,240,530 A | * | 12/1980 | Tillenburg | 188/250 E |
| 4,537,290 A | * | 8/1985 | Evans | 188/73.31 |
| 5,033,590 A | * | 7/1991 | Kobayashi et al. | 188/1.11 W |
| 5,427,213 A | * | 6/1995 | Weiler et al. | 188/250 E |
| 5,480,008 A | * | 1/1996 | Hummel et al. | 188/73.37 |
| 5,494,140 A | * | 2/1996 | Weiler et al. | 188/73.38 |
| 5,509,508 A | * | 4/1996 | Evans | 188/73.38 |
| 5,617,935 A | * | 4/1997 | Chuang et al. | 188/73.1 |
| 5,816,370 A | * | 10/1998 | Verbeeten et al. | 188/73.37 |
| 5,842,546 A | * | 12/1998 | Biswas | 188/73.37 |
| 5,875,873 A | * | 3/1999 | Kay et al. | 188/73.38 |
| 6,170,620 B1 | | 1/2001 | Akita et al. | 188/251 |
| 6,256,858 B1 | * | 7/2001 | Brosilow | 29/525.05 |
| 6,349,803 B1 | * | 2/2002 | Brosilow | 188/73.37 |
| 6,367,600 B1 | * | 4/2002 | Arbesman | 188/250 G |
| 6,578,680 B1 | * | 6/2003 | Bosco et al. | 188/250 G |
| 2004/0035651 A1 | * | 2/2004 | Renauld | 188/73.37 |
| 2004/0134725 A1 | | 7/2004 | Bosco et al. | |
| 2005/0034940 A1 | * | 2/2005 | Roberts | 188/250 B |

FOREIGN PATENT DOCUMENTS

EP    999376 A    5/2000

* cited by examiner

Primary Examiner—Robert A. Siconolfi

(57) ABSTRACT

A friction assembly has a brake pad and a noise damping shim. The noise damping shim is engaged with a backing plate of the brake pad using a coupler. The coupler has a first coupler member formed on the backing plate and a second coupler member formed on the shim. In certain embodiments, the coupler may be a rivet coupler or a snap-in coupler.

14 Claims, 8 Drawing Sheets

FRICTION ASSEMBLY AND METHOD FOR MANUFACTURING SAME

FIELD OF THE INVENTION

This invention relates to a brake system, and more particularly to a friction assembly having a brake pad and a noise damping shim suitably used in a brake system on a vehicle and a method for manufacturing the same.

BACKGROUND OF THE INVENTION

A typical brake system uses one or more friction assemblies. A friction assembly is a replaceable element. A friction assembly comprises a brake pad having a friction material mounted on a backing plate. For example, in a typical disc brake, a rotating disc or rotor rotates with a wheel of a vehicle. A pair of opposing friction assemblies are positioned on opposite sides of the rotor such that both friction materials face to the rotor. Outside the friction assemblies are a piston and a corresponding caliper, respectively. When the brake is actuated and the piston and caliper are advanced closer to each other, the friction assemblies are pressed against the rotor between the piston and caliper. Thus, the friction materials contact the rotor to provide a stopping frictional force.

Significant forces are involved in applying the friction materials to the rotor. Due to the relative movement during the engagement of the friction materials and the rotor, squeal noise can be produced. In order to reduce the squeal noise, it is known to attach a noise damping shim to the brake pad.

The noise damping shim is typically attached to the backing plate of the brake pad using pins or staples through holes formed on the backing plate and shim. In this construction, the shim is subject to significant torques between the friction assembly and the piston or caliper pushing the shim against the brake pad during the braking operation. In order to minimize movements of the shim relative to the brake pad, the pins and holes need to be precisely dimensioned. Also, the use of pins increases the number of components to be assembled, which increases manufacturing costs.

In some friction assemblies, a noise damping shim has tabs or hooks projecting outwardly from the periphery of the shim. When the shim is attached to a backing plate, the hooks are bent and engaged to the backing plate. This type of friction assembly is advantageous for requiring fewer components to be assembled compared to the friction assemblies that use pins. However, the provision of the tabs require additional shim materials and the hook bending process during the assembling requires a complicated assembling machine.

It is therefore desirable to provide a backing plate having improved engagement between a brake pad and a noise damping shim without involving undue extra manufacturing costs.

SUMMARY OF THE INVENTION

The present invention uses a coupling mechanism on a backing plate and a shim to facilitate efficient engagement of the backing plate and shim.

In accordance with an aspect of the invention, there is provided a friction assembly for a brake. The friction assembly comprises a brake pad and a noise damping shim. The brake pad has a friction material for producing friction when the brake is in use, and a backing plate having a friction supporting surface for supporting the friction material and a back surface opposite to the friction supporting surface, the back surface having a first coupler member. The noise damping shim has a first surface for engaging with the back surface of the backing plate, and a second surface for receiving a compression force when the brake is in use, the first surface having a second coupler member for engaging with the first coupler member provided on the back surface of the backing plate so as to couple the noise damping shim with the backing plate.

In accordance with another aspect of the invention, there is provided a backing plate for a friction assembly for a brake. The backing plate and a friction material together form a brake pad for use in the friction assembly. The backing plate comprises a friction supporting surface for supporting a friction material for producing friction when the brake is in use, a back surface opposite to the friction supporting surface, the back surface being adapted to receive a noise damping shim, and a first coupler member formed on the back surface for engaging with a second coupler member formed on the noise damping shim to couple the noise damping shim with the backing plate.

In accordance with another aspect of the invention, there is provided a method of assembling a noise damping shim with a brake pad having a backing plate and a friction material mounted on the backing plate. The method comprises the steps of: providing a first coupler member on a back surface of a friction assembly having a friction pad for producing friction when the brake is in use; and a backing plate having a friction supporting surface for supporting the friction pad and a back surface opposite to the friction supporting surface; providing a second coupler member on a noise damping shim having a first surface adapted for engagement with the back surface of the backing plate, and a second surface adapted for receiving a compression force when the brake is in use; and coupling the second coupler member provided on the noise damping shim with the first coupler member provided on the back surface of the backing plate so as to couple the shim with the backing plate.

BRIEF DESCRIPTION OF THE DRAWINGS

For a better understanding of the present invention, and to show more clearly how it may be carried into effect, reference will now be made by way of example to the accompanying drawings. The drawings show preferred embodiments of the present invention, in which.

DETAILED DESCRIPTION OF THE PREFERRED EMBODIMENTS

Figure 1:
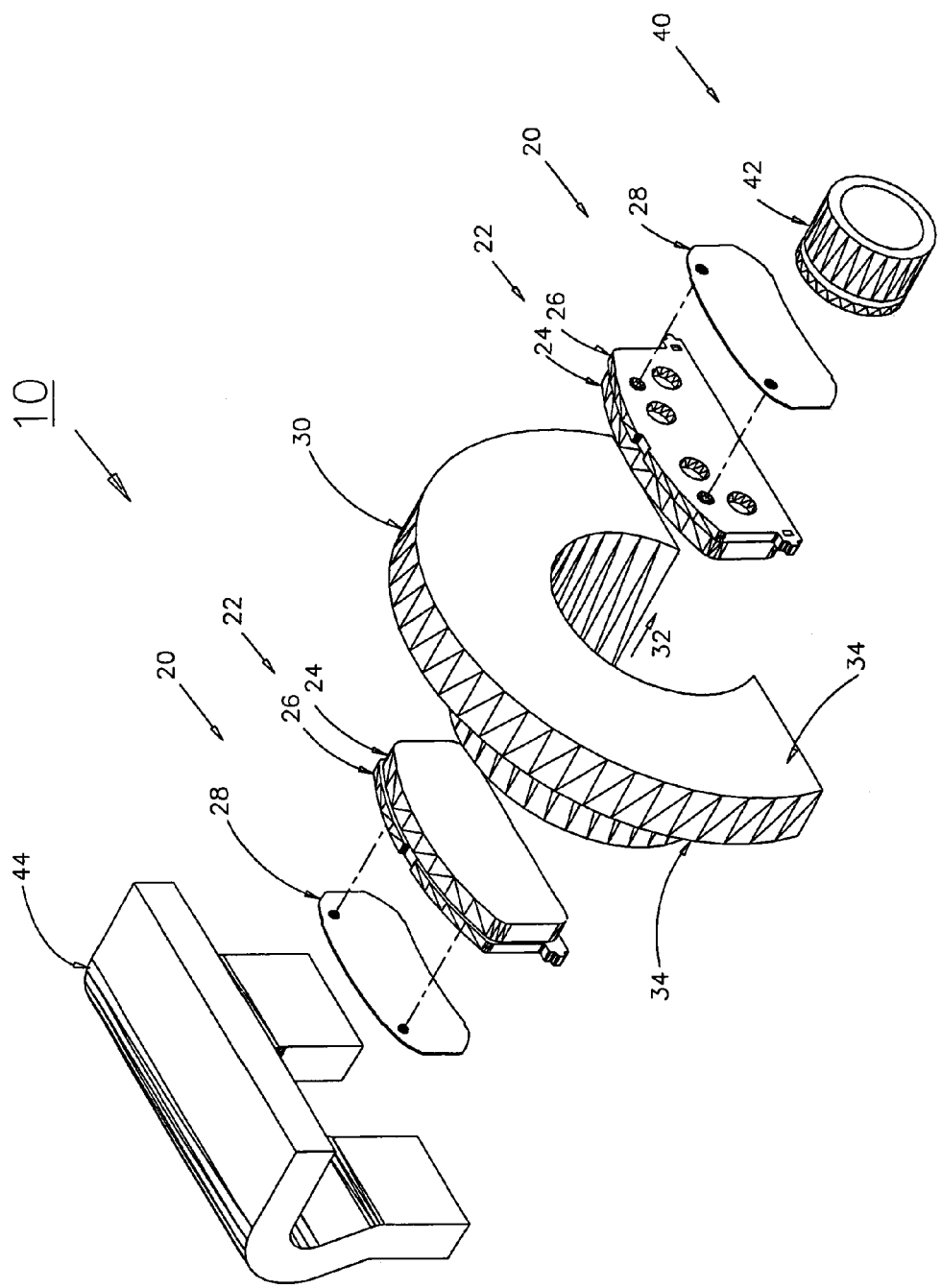
FIG. 1 is a perspective explored view of a brake system in which a friction assembly in accordance with an embodiment of the present invention is used.

Referring to FIG. 1, a brake system 10 in which friction assemblies 20 according to an embodiment of the present invention is suitably used. This embodiment is described using a disc brake system for a vehicle as an example, however, the present invention may be applied to different types of brake systems.

The brake system 10 includes a pair of friction assemblies 20 arranged in opposite sides on a rotating disc or, rotor 30, and brake actuating mechanism 40 provided outside the pair of friction assemblies 20.

The rotor 30 rotates with a wheel of the vehicle along a rotation axis 32. The rotor 30 has opposing flat end surfaces 34 extending parallel to each other and perpendicular to the rotation axis 32.

The brake actuating mechanism 40 includes a piston 42 and a corresponding caliper 44, each provided outside of each respective friction assembly 20. When the brake system 10 is actuated, the piston 42 and caliper 44 are brought closer to each other by e.g., a hydraulic pressure mechanism. The piston 42 and caliper 44 press the friction assemblies 20 against the flat end surfaces 34 of rotor 30 from the opposing sides, thus a braking force is produced between the friction assembly 20 and the rotor 30.

Referring further to FIGS. 2–5, the friction assembly 20 is described in further detail.

Each friction assembly 20 has a brake pad 22 which comprises a friction material 24 and a backing plate 26. The friction material 24 is mounted on a front surface 26a of backing plate 26. The friction material 24 is typically mounted on the front surface 26a of backing plate 26 by moulding it on the front surface 26a with or without an adhesive layer between them. Different methods of mounting the friction material 24 on the front surface 26a of the backing plate 26 may be used. The backing plate 26 may have holes 27 for manufacturing processes or other purposes.

Figure 2:
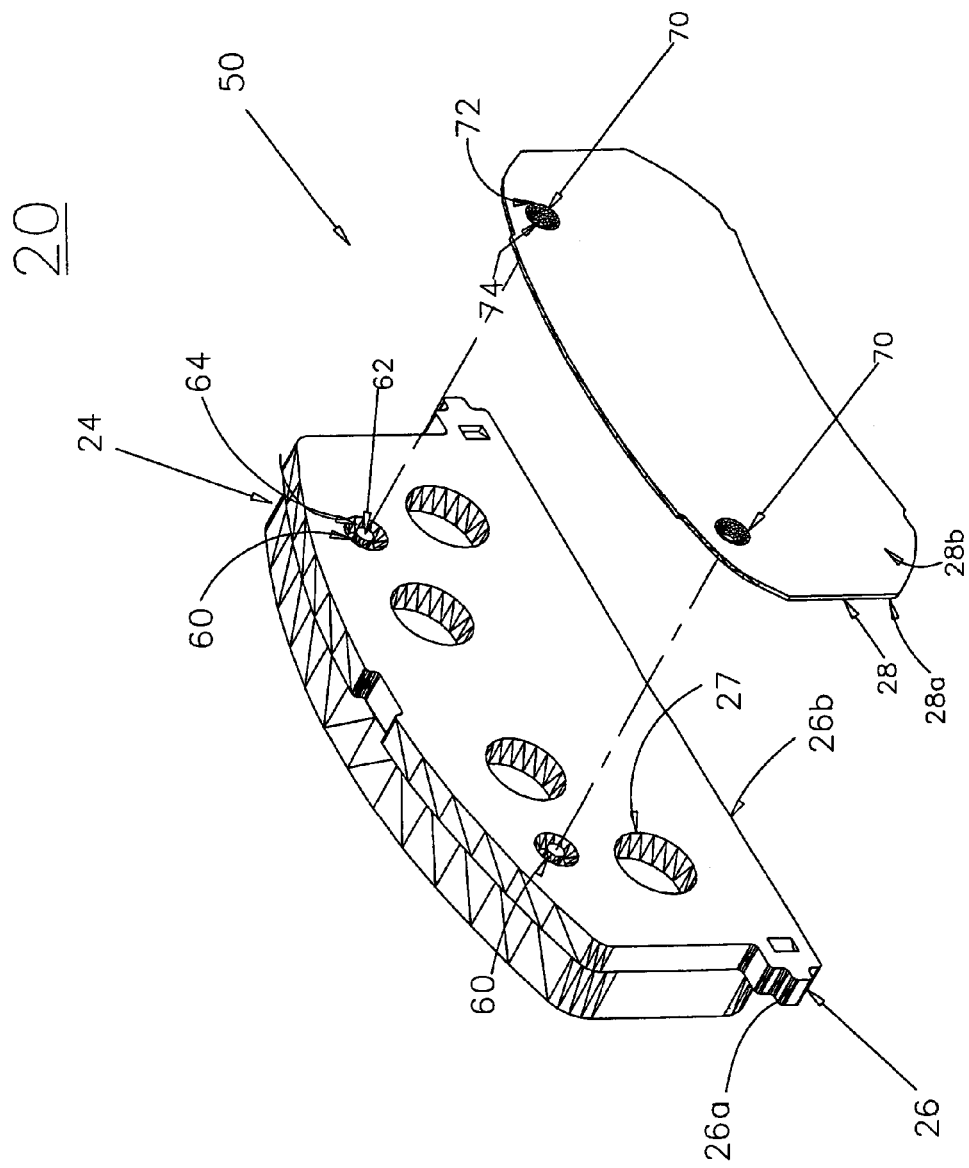
FIG. 2 is a perspective explored view of the friction assembly of FIG. 1.
Figure 3:
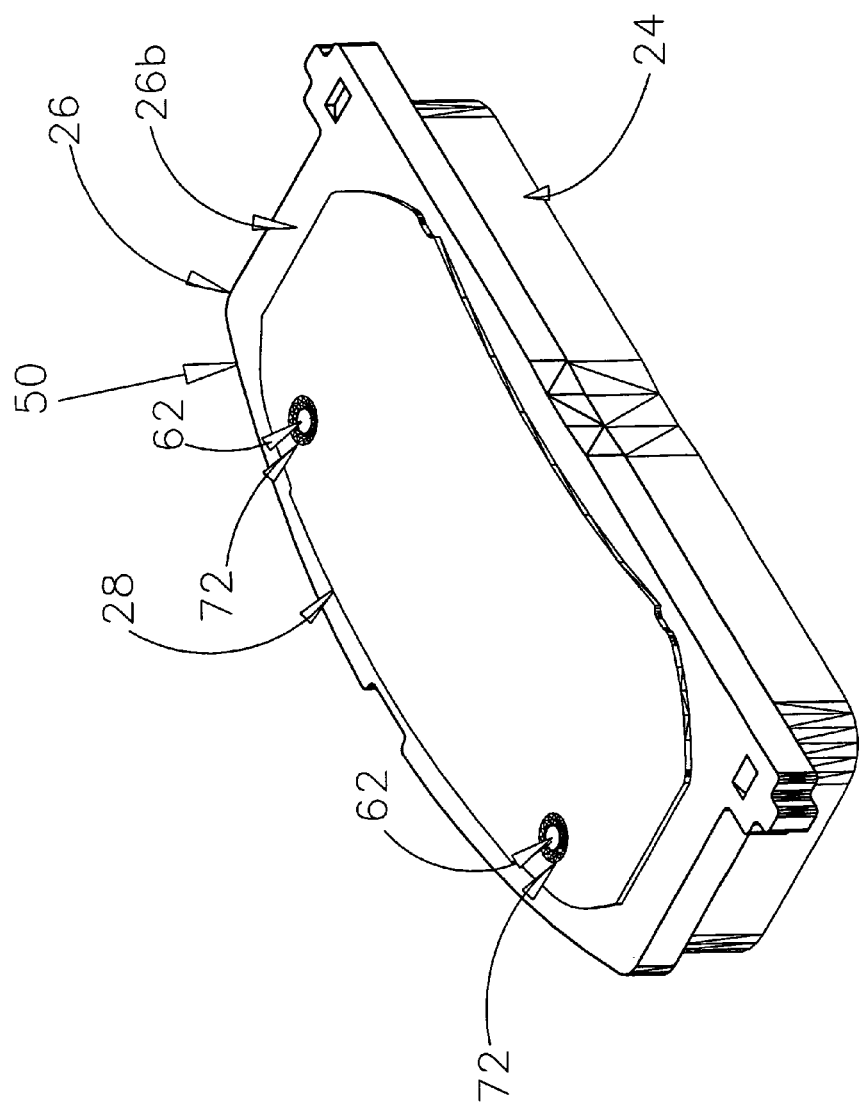
FIG. 3 is a perspective view of the friction assembly as assembled.

Each friction assembly 20 also has a noise damping shim 28. As shown in FIGS. 2 and 3, the noise damping shim 28 is attached to a back surface 26b of the backing plate 26 using couplers 50. FIGS. 2 and 3 show two couplers 50 used for a single friction assembly 20. The two couplers 50 are provided at locations relatively close to two upper corners where the couplers 50 do not interfere with other holes 27 formed on the backing plate 26. The number and locations of couplers used in a single friction assembly may be determined depending on the desired design and application of the friction assembly.

Each coupler 50 comprises a first coupler element 60 formed on the back surface 26b of the backing plate 26, and a second coupler element 70 formed on the front surface 28a of the noise damping shim 28.

Figure 4:
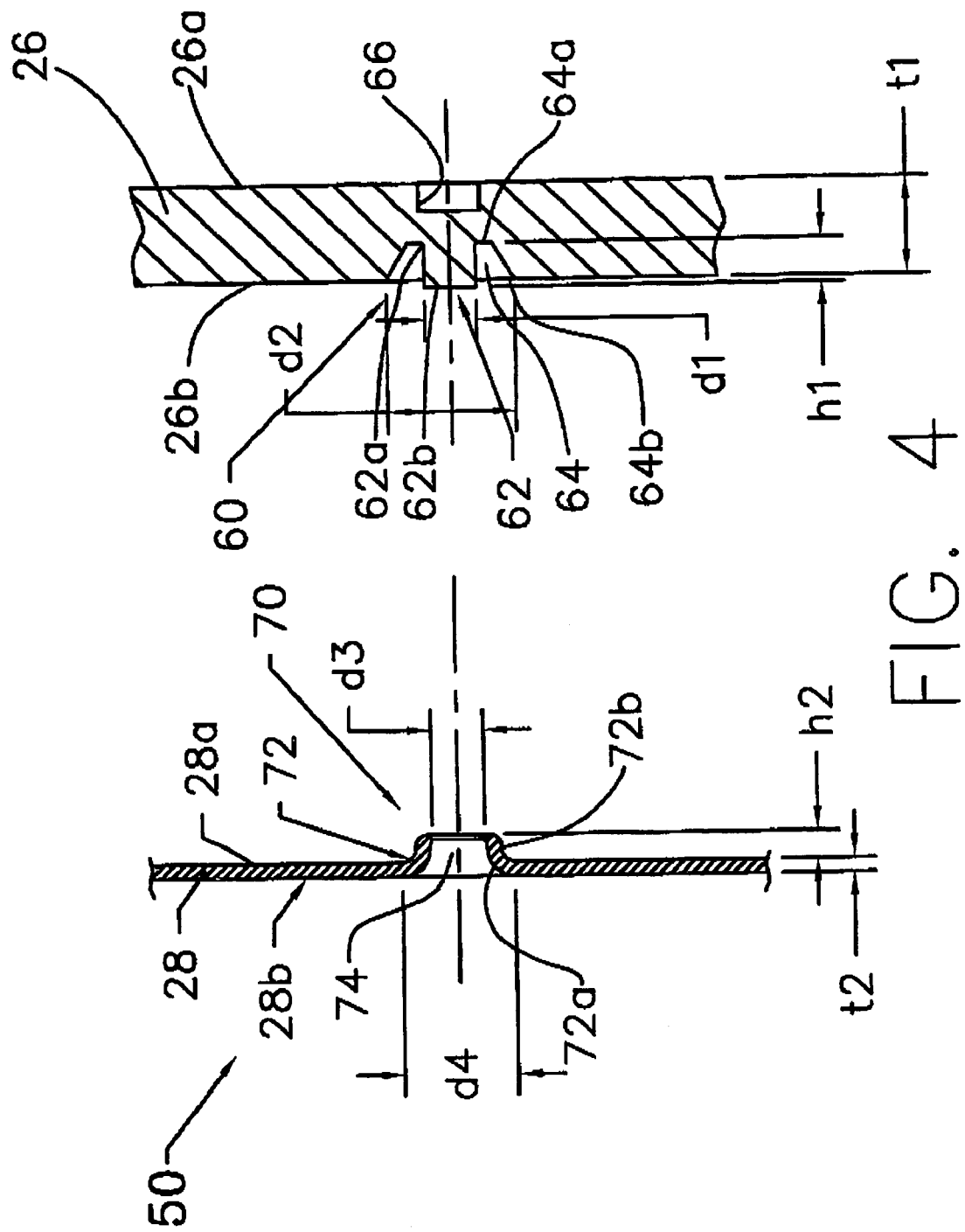
FIG. 4 is a partial cross-sectional view showing a coupler prior to engagement according to the embodiment.

The first coupler element 60 has a stem 62 and a recess 64 surrounding the stem 62, as best seen in FIGS. 2 and 4. The recess 64 is defined on the back surface 26b inwardly into the backing plate 26 from an opening mouth 64b to a bottom 64a. The opening mouth 64b has generally a round shape. The diameter of the opening diminishes from mouth 64b to the bottom 64a. The recess 64 is deep enough to function as a coupler but shallow enough so that it does not affect to the necessary strength of the backing plate 26. The stem 62 generally has a cylindrical shape. Its connection end 62a is connected to the backing plate 26 at the bottom 64b of the recess 64. The head 62b of the stem 62 may project slightly outwardly over the back surface 26b of the backing plate 26 as shown in FIG. 4, or it may remain within the recess 64, depending on the particular application.

The second coupler element 70 has a rim 72 defining a hole 74. The rim 72 protrudes towards the backing plate 26 from a connection section 72a where the rim 72 is connected to the main body of the shim 28. The protruding rim body forms a tubular section 72b. The tubular section 72b has generally a cylindrical tubular shape with generally a constant inner diameter d3. The length of the tubular section 72b is shorter than the height of the stem 62 of the first coupler member 60. The connection section 72a is smoothly curved to provide an inner diameter d4 which is larger than the diameter d3 of the tubular section 72b. The connection section 72a does not have to be curved. For example, the connection section 72a may have one or more stepping shoulders to provide a larger diameter d4 in different embodiments.

The shapes and dimensions of the stem 62 and recess 64 of the first coupler member 60 correspond to those of the rim 72 of the second coupler member 70 such that the stem 62 is received in the hole 74 and the rim 72 is received in the recess 64 when the first and second coupler members 60 and 70 are engaged.

The height h1 of the stem 62 of the first coupler member 60 is typically between about 0.07 to 0.09 inches (about 2.24 to 3.98 mm) for backing plate 26 having a thickness t1 of about 0.125 to 0.27 inches (about 3.18 to 6.86 mm). The diameter d1 of the stem 62 is typically about 0.095 to 0.105 inches (about 2.41 to 2.67 mm. The diameter d2 of the opening mouth 64b of the recess 64 is typically about 0.27 to 0.30 inches (about 6.85 to 7.62 mm). The height h2 of the tubular section 72b of the rim 72 of the second coupler member 70 is typically between about 0.04 to 0.07 inches (about 1.02 to 1.78 mm) for noise damping shim 28 having a thickness t2 of about 0.02 to 0.035 inches (about 0.51 to 0.89 mm). The inner diameter d3 of the tubular section 72b is typically about 0.107 to 0.112 inches (about 2.72 to 2.84 mm). The inner diameter of the tubular section 72a is typically slightly larger than the diameter d1 of the stem 62. The diameter d4 of the curved section 72a is typically about 0.20 to 0.21 inches (about 5.08 to 5.33 mm). However, all of these dimensions may vary depending on the application.

The first and second coupler elements 60 and 70 are provided at locations such that the noise damping shim 28 can be engaged with the backing plate 26 at a desired location when the first and second coupler elements 60 and 70 mate with each other.

It is preferable that the first and second coupler members 60 and 70 are integrally formed with the backing plate 26 and shim 28, respectively, as exemplified in FIG. 4. For example, the first coupler element 60 may be formed on the backing plate 26 by stamping the backing plate material with suitable progressive dies or fine blanking dies to form stem 62 and recess 64. Similarly, the second coupler member 70 may be formed by stamping the shim material using dies.

When the friction assembly 20 is assembled, the shim 28 is brought into contact with the backing plate 26. The rim 72 of the second coupler member 70 is received in the recession 64 and the stem 62 is received in the hole 74 defined by the rim 72. As the length of the tubular section 72b is shorter than the height of the stem 62 of the first coupler member 60, the head 62b of the stem 62 reaches the connection section 72a of the rim 72, as best seen in FIG. 3.

Figure 5:
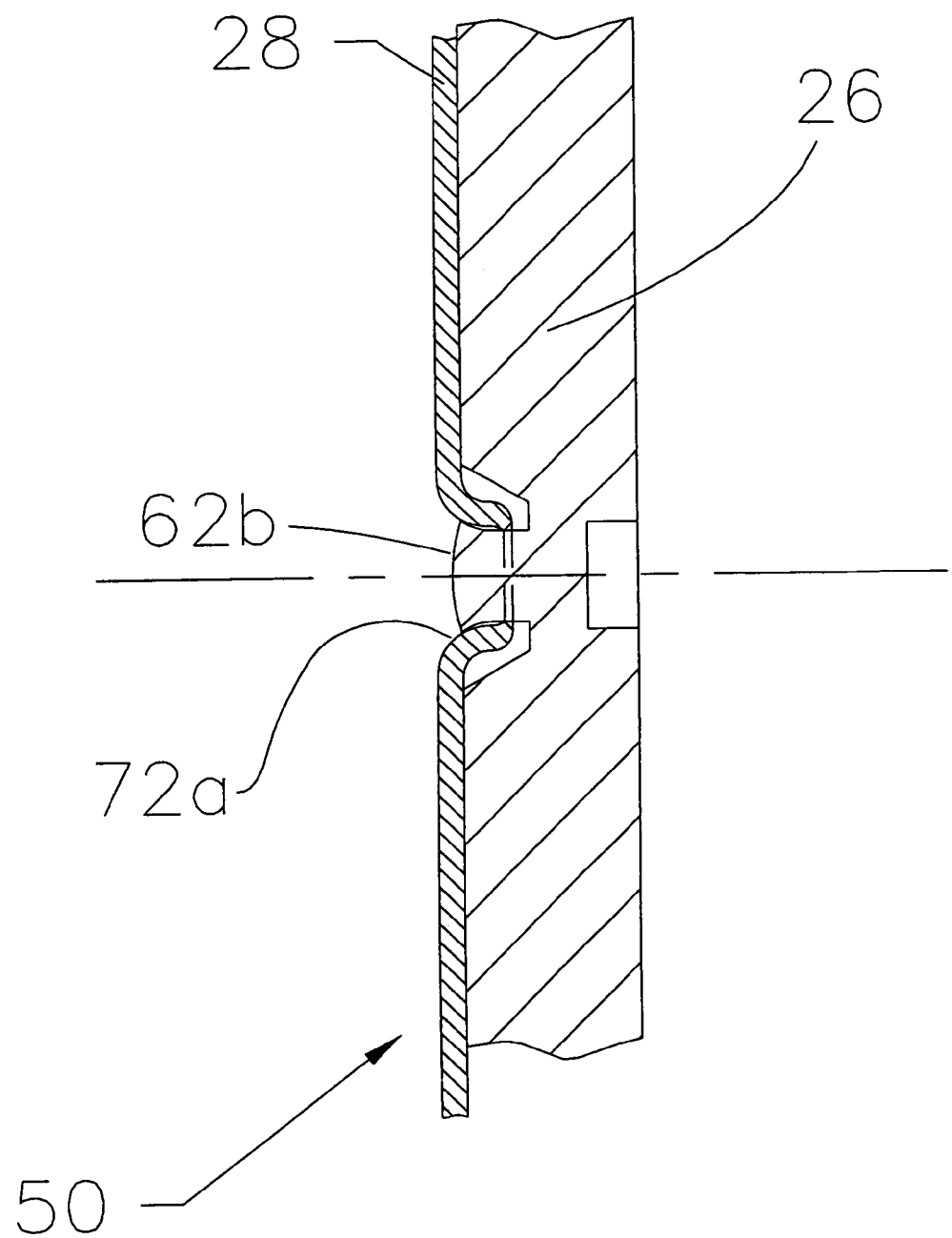
FIG. 5 is a partial cross-sectional view showing the coupler shown in FIG. 4 after the engagement.

In order to secure the engagement between the first coupler element 60 and the second coupler element 70, the head 62b of the stem 62 is pushed back towards the backing plate 26, as shown in FIG. 5. This pushing force deforms the head 62b to close at least partially the opening 74 at the connection section 72a of the rim 72. As the diameter d4 at the connection section 72a is larger than the diameter d3 of the tubular section 72b, the deformed head 62b would not disengage through the tubular section 72b. Thus, the deformed stem 62 acts as a rivet, securing the engagement between the first coupler element 60 and the second coupler element 70.

Thus, the shim 28 can be efficiently assembled with the backing plate 26 without a need for extra components, such as a pin or staple.

In the above embodiment, the coupler 50 is coupled as a rivet. In a different embodiment, the coupler may be coupled by a snap-in fashion.

Figure 6:
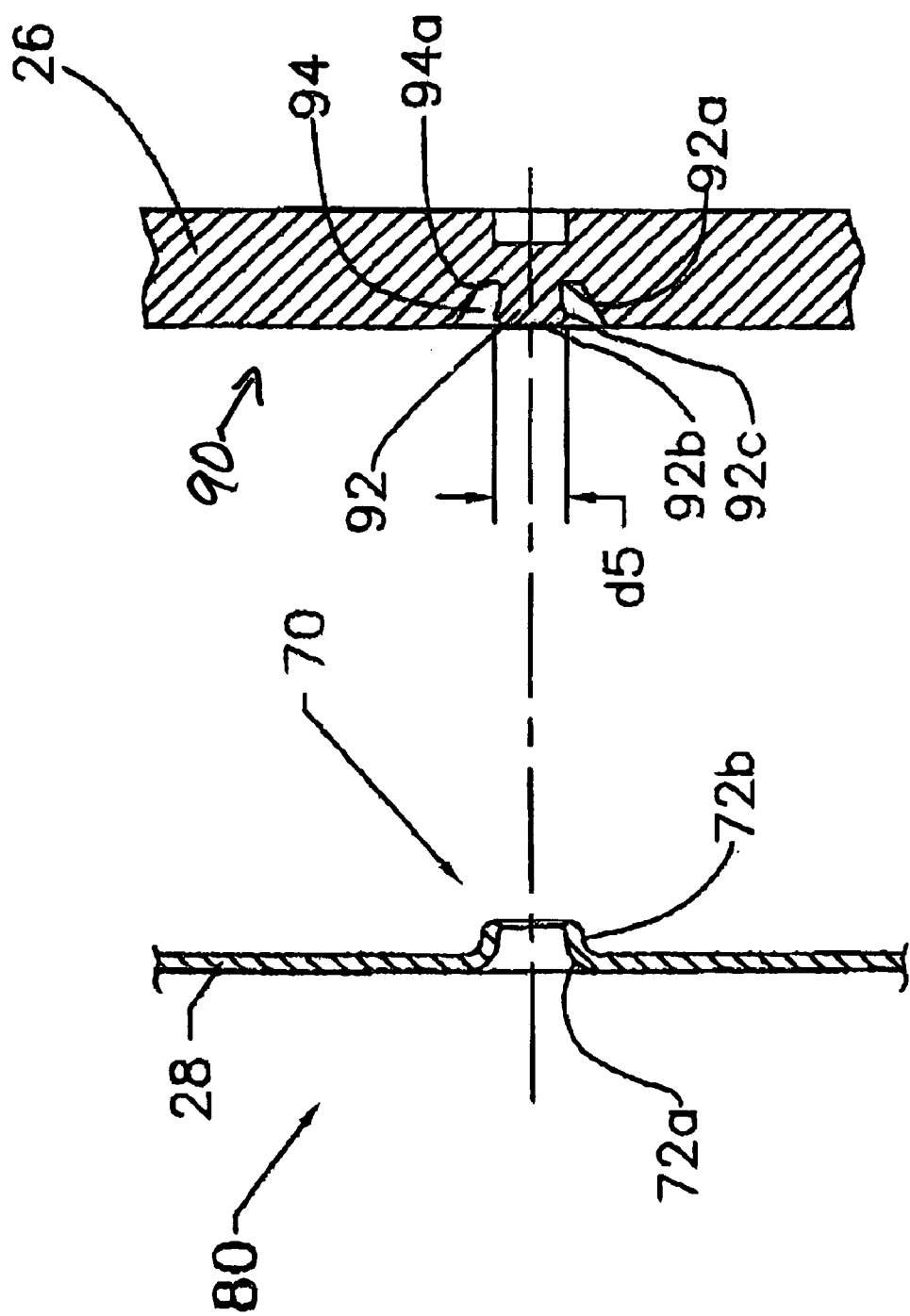
FIG. 6 is a partial cross-sectional view showing another coupler prior to engagement according to another embodiment.
Figure 6A:
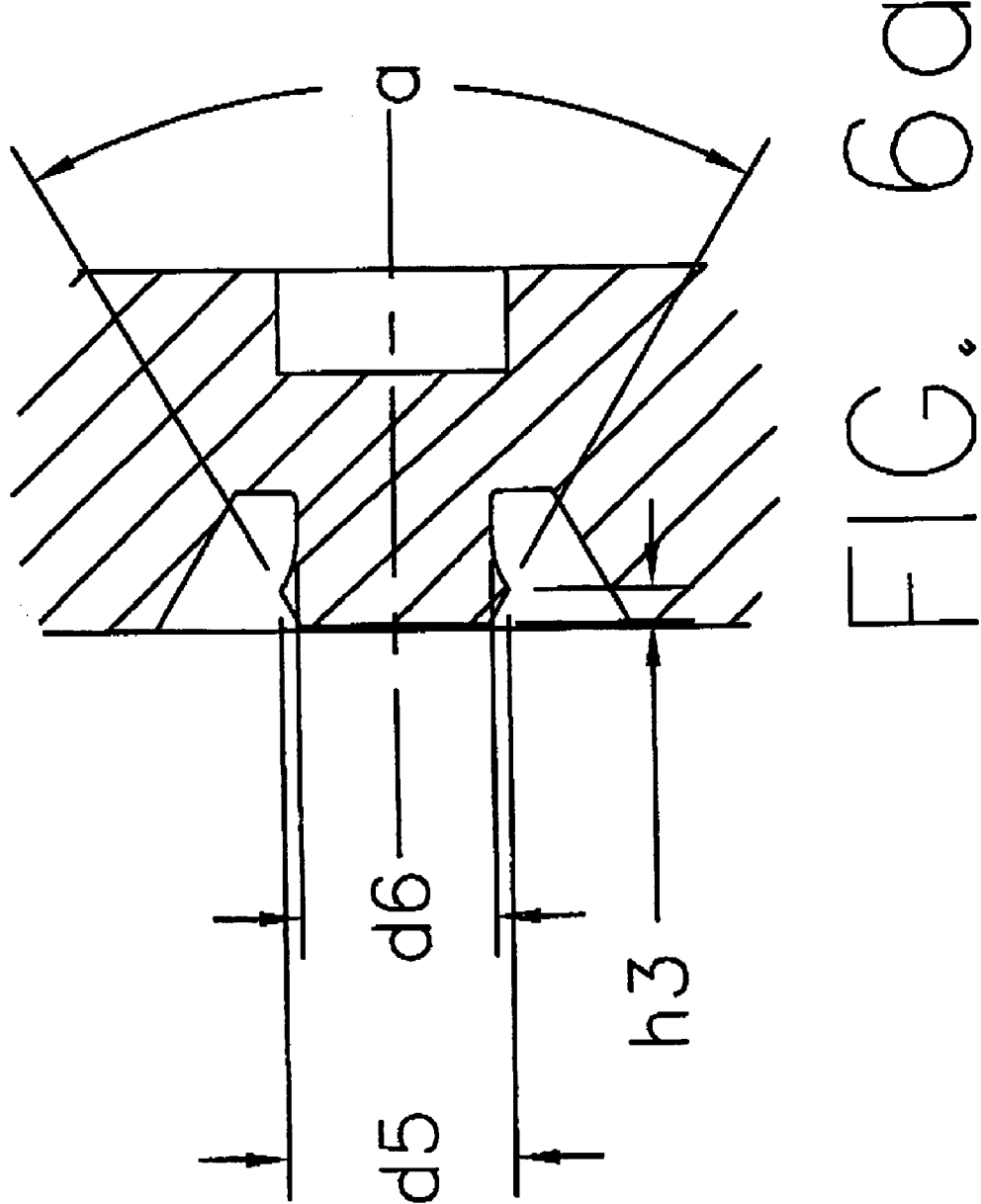
FIG. 6a is a partial enlarged cross-sectional view showing details of the coupler shown in FIG. 6.
Figure 7:
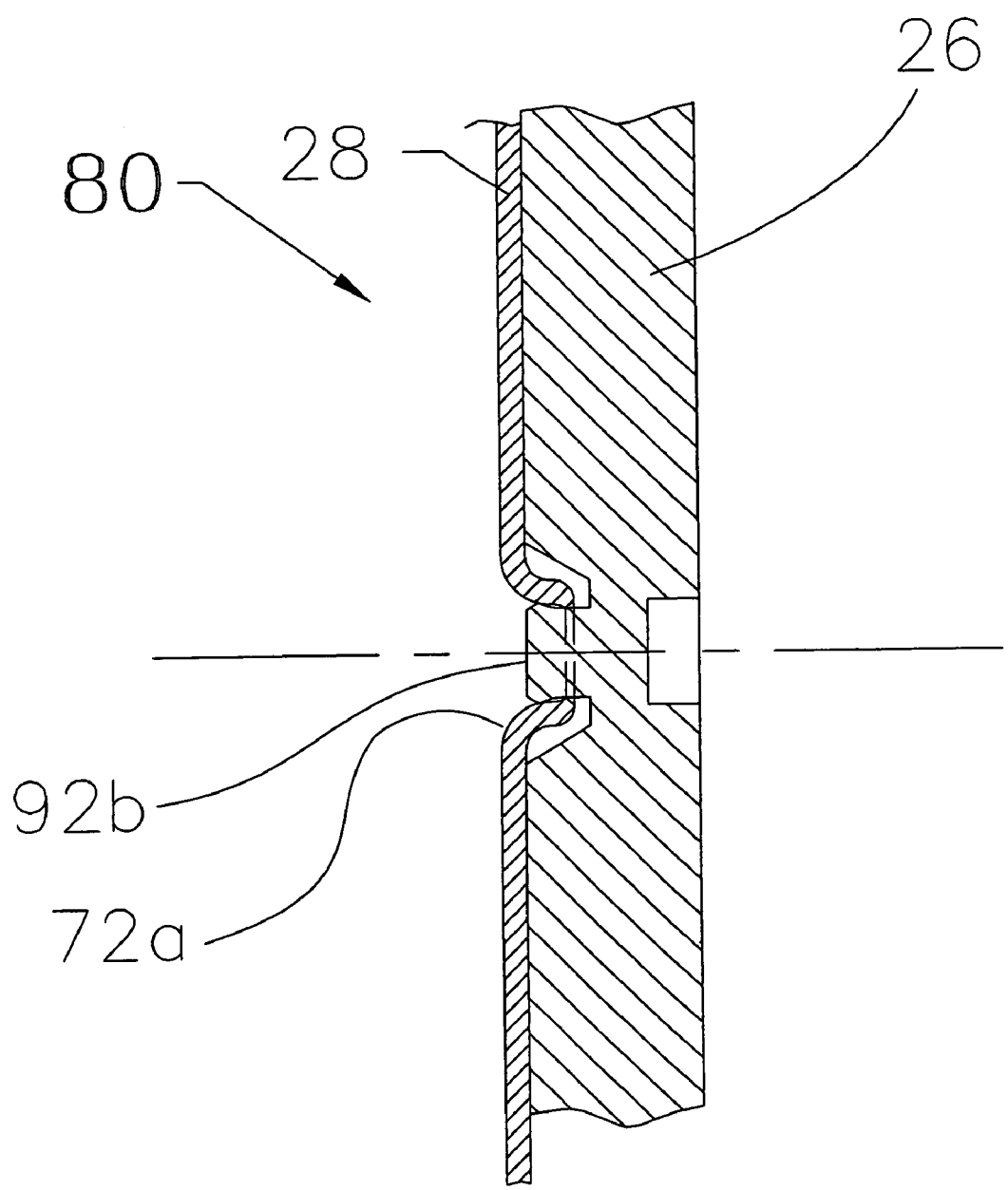
FIG. 7 is a partial cross-sectional view showing the coupler shown in FIG. 6 after the engagement.

FIGS. 6, 6A and 7 show an example of a snap-in coupler 80. The snap-in coupler 80 has a first coupler member 90 and a second coupler member 70. The second coupler member 70 of the snap-in coupler 80 is similar to the second coupler 70 of the rivet coupler 50 shown in FIGS. 4 and 5 and the similar components are denoted with the same reference numbers.

The first coupler member 90 of the snap-in coupler 80 has a stem 92 and a recess 94. The recess 94 has a mouth 94a defining an opening around the stem 92. The stem 92 has a connection end 92a where it is connected to the bottom 94a of the recess 94, similar to the first coupler 60 shown in FIG. 4.

In this embodiment, however, the stem 92 has an enlarged head 92b. The enlarged head 92b has an enlarged section 92c that has a larger diameter d5 than the rest of the stem 92. This diameter d5 is larger than the diameter d3 of the tubular section 72b of the second coupler member 70. Alternatively, the enlarged head 92b may have bumps around its periphery to provide a diameter d5 at the bumps.

In this embodiment, as shown in FIG. 6a, the enlarged head 92b is slanted from the free end of diameter d6 to the enlarged section 92c of diameter d5. The diameter d6 is smaller than the diameter d5 to facilitate the insertion of the stem 92 into the tubular section 72b of the second coupler member 70. The diameter d5 is typically about 0.12 to 0.13 inches (about 3.05 to 3.30 mm) and the diameter d6 is typically about 0.095 to 0.105 niches (about 2.41 to 2.67 mm). The open angle a of the slanted head is typically about 60 to 80 degrees. The enlarged section 92c is typically formed at about 0.02 to 0.03 inches (about 0.51 to 0.76 mm) from the free end of the head 92b. Similar to the stem 62 shown in FIG. 4, the height of the stem 92 typically about 0.07 to 0.09 inches (about 2.24 to 3.98 mm). However, these dimensions may vary depending on the design and purpose of the coupler 80.

When the friction assembly 80 is assembled, the noise damping shim 28 is brought into contact with the backing plate 26. During this contact, the enlarged head 92b of the stem 92 is snapped into the hole 74 at the connection section 72a through the tubular section 72b. As the enlarged head 92b is larger than the diameter of the tubular section 72b, the engagement between the first coupler element 90 and the second coupler element 70 is secured against torque during the brake operations. It is preferable that the length of the stem 92 is selected such that the enlarged head 92b snaps into the opening defined by the connection section 72a of the rim 72 only when the first and second coupler members 90 and 70 mate. In this case, the noise damping shim 28 is secured to the backing plate 26 not only in the direction of the torques but also in the direction perpendicular to the torques.

According to this embodiment, the noise damping shim 28 can be efficiently assembled with the backing plate 26 in a single process without a need for extra components or complicated tools.

In the above embodiments, the stem of the coupler is formed on the backing plate and the stem receiving hole is formed on the shim. In a different embodiment, a stem may be formed on the shim and a stem receiving hole may be formed on the backing plate. Also, in the above embodiments the components of the coupler generally have cylindrical shapes. In different embodiments, other shapes for coupler components suitable for coupling the shim on the backing plate may be used. A single friction assembly may have several different types of couplers.

It is to be understood that particular embodiments of the invention have been described in this specification. The invention nonetheless is susceptible to certain changes and alternative embodiments fully comprehended by the spirit of the invention as described above, and the scope of the claims set out below.

The invention claimed is:

1. A backing plate for use in a friction assembly for a brake, the friction assembly comprising a brake pad which includes the backing plate and a friction material, the backing plate comprising:
   a friction supporting surface for supporting the friction material for producing friction when the brake is in use;
   a back surface opposite to the friction supporting surface, the back surface being adapted to receive a noise damping shim; and
   a first coupler member formed on the back surface for engaging with a second coupler member formed on the noise damping shim, the second coupler member having a rim defining a hole to couple the noise damping shim with the backing plate, the first coupler member having:
      a stem adapted to be received in the hole of the second coupler member, the stem having a connection end where the stem is connected to the backing plate and a distal end opposite to the connection end, the stem having a height and an enlarged section having a larger-cross section, wherein the enlarged section is near the distal end of the stem and engages the rim of the second coupler member to prevent disengagement of the shim from the backing plate upon assembly;
      a recess surrounding the stem to accept the rim of the second coupler member, the recess having a depth defined by an opening mouth and a bottom,
      wherein the height of the stem is less than the depth of the recess such that the distal end of the stem remains within the recess prior to and after coupling of the first and second coupler members.

2. The backing plate as claimed in claim 1, wherein the stem of the first coupler member is deformed to form the enlarged section prior to assembly of the frictional assembly such that upon assembly of the backing plate, the second coupler member will be attached to the first coupler member by snap fitting the first and second coupler members together.

3. The backing plate as claimed in claim 1, wherein the first coupler member is integrally formed with the backing plate.

4. The backing plate as claimed in claim 1, wherein:
   the rim of the second coupler member has a tubular section having a first rim diameter, and a connection section having a second rim diameter which is larger than the first rim diameter; and the enlarged section of the stem of the first coupler member has a stem diameter which is larger than the first rim diameter of the tubular section of the rim of the second coupler member so as to secure engagement between the first and second coupler members.

5. The backing plate as claimed in claim 1, wherein the enlarged section of the stem of the first coupler member is formed as an enlarged head that is slanted from the distal end of the stem.

6. A method of assembling a friction system for a brake having a noise dampening shim, the method comprising the steps of:

providing a first coupler member comprising a stem having a region with an enlarged cross-section positioned near a distal end of the stem and a recess surrounding the stem on a back surface of a backing plate for a friction assembly, the fiction assembly having:

a friction pad for producing friction when the brake is in use; and the backing plate having a friction supporting surface for supporting the friction pad and the back surface opposite to the friction supporting surface, wherein the stem has a height between the distal end and a connection end where the stem is connected to the backing plate, the recess has a depth defined by an opening mouth and a bottom, and the height of the stem is less than the depth of the recess such that the distal end of the stem is within the recess;

providing a second coupler member having a rim defining a hole on the noise dampening shim, the noise dampening shim adapted for engagement with the back surface of the backing plate; and snapping in the enlarged section of the stem of the first coupler member into the hole of the second coupler member so that the enlarged section of the stem engages the rim of the hole to couple the noise dampening shim with the backing plate.

7. The method as claimed in claim 6, wherein:

the step for providing the second coupler member provides the hole with an enlarged section; and the snapping step forces the enlarged section of the stem of the first coupler member into the enlarged section of the hole of the second coupler member so that the enlarged section of the stem of the first coupler member secures the first coupler member and the second coupler member.

8. The method as claimed in claim 6, wherein:

the step of providing the first coupler member forms the stem such that a distal end of the stem remains within the recess.

9. A backing plate for use in a friction assembly for a brake, the backing plate comprising:

a friction supporting surface for supporting a friction material; and a back surface opposite to the friction supporting surface for coupling with a noise-dampening shim having a rim defining a hole extending from the surface of the shim, the back surface having:

a stem adapted to be received in the hole of the shim, the stem having a connection end where the stem is connected to the backing plate and a distal end opposite to the connection end, the distal end having an enlarged section with a larger cross-section than the remainder of the stem, wherein the enlarged section of the stem of the backing plate is adapted for press-fitting into the hole of the shim to couple the shim to the backing plate; and a recess surrounding the stem, the recess having a depth defined by an opening mouth and a bottom, wherein the height of the stem is less than the depth of the recess.

10. A friction assembly for a brake, the friction assembly comprising:

the backing plate according to claim 9 having a friction material affixed onto the friction supporting surface; and a noise-dampening shim coupled to the stem of the backing plate.

11. The friction assembly as claimed in claim 10, wherein:

the shim has a rim defining a hole to couple with the stem of the backing plate, and the rim has a tubular section having a first rim diameter, and a connection section having a second rim diameter which is larger than the first rim diameter; and the enlarged section of the stem of the backing plate has a stem diameter which is larger than the first rim diameter of the tubular section of the rim of the shim so as to secure engagement between the backing plate and the shim.

12. The friction assembly as claimed in claim 10, wherein the enlarged section of the stem is formed as an enlarged head that is slanted from the distal end of the stem.

13. The backing plate as claimed in claim 9, wherein:

the rim of the shim has a tubular section having a first rim diameter, and a connection section having a second rim diameter which is larger than the first rim diameter; and the enlarged section of the stem of the backing plate has a stem diameter which is larger than the first rim diameter of the tubular section of the rim of the shim so as to secure engagement between the backing plate and the shim.

14. The backing plate as claimed in claim 9, wherein the enlarged section of the stem is formed as an enlarged head that is slanted from the distal end of the stem.

* * * * *

UNITED STATES PATENT AND TRADEMARK OFFICE
CERTIFICATE OF CORRECTION

PATENT NO.        : 7,097,008 B2                                         Page 1 of 1
APPLICATION NO.   : 10/671856
DATED             : August 29, 2006
INVENTOR(S)       : Pham et al.

It is certified that error appears in the above-identified patent and that said Letters Patent is hereby corrected as shown below:

On the Title page of the patent, item 73 add the following:

ASSIGNEE:    Capital Tool & Design Limited
             Concord, Ontario, Canada Column 7, line 19 (claim 6), "fiction" should read --friction--.

Signed and Sealed this

Twenty-second Day of May, 2007

JON W. DUDAS
*Director of the United States Patent and Trademark Office*

UNITED STATES PATENT AND TRADEMARK OFFICE
CERTIFICATE OF CORRECTION

PATENT NO.        : 7,097,008 B2                                              Page 1 of 1
APPLICATION NO. : 10/671856
DATED             : August 29, 2006
INVENTOR(S)       : Pham et al.

It is certified that error appears in the above-identified patent and that said Letters Patent is hereby corrected as shown below:

On the Title page of the patent, item 73 add the following:

ASSIGNEE:   --Capital Tool & Design Limited
            Concord, Ontario, Canada--

Column 7, line 19 (claim 6), "fiction" should read --friction--.

Signed and Sealed this

Twenty-ninth Day of May, 2007

JON W. DUDAS
*Director of the United States Patent and Trademark Office*